(12) United States Patent
Yamanaka et al.

(10) Patent No.: US 6,387,046 B2
(45) Date of Patent: May 14, 2002

(54) ELECTRONIC ENDOSCOPE APPARATUS FOR DISCRIMINATING OPTICALLY VARIABLE POWER FROM ELECTRONICALLY VARIABLE POWER

(75) Inventors: Kazuhiro Yamanaka; Mitsuru Higuchi, both of Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/797,944

(22) Filed: Mar. 5, 2001

(30) Foreign Application Priority Data

Mar. 13, 2000 (JP) .......................................... 2000-068384

(51) Int. Cl.$^7$ ................................................. A61B 1/04
(52) U.S. Cl. ........................................ 600/168; 348/240
(58) Field of Search ................................. 600/109, 168; 348/240, 358, 65

(56) References Cited

U.S. PATENT DOCUMENTS 5,420,632 A * 5/1995 Yamigawa .................. 348/240
6,046,770 A * 4/2000 Uemura et al. ............. 348/240

* cited by examiner

*Primary Examiner*—John Mulcahy
(74) *Attorney, Agent, or Firm*—Snider & Associates; Ronald R. Snider

(57) ABSTRACT

When a variable powers witch of an electroscope is operated, a motor is driven to move a movable lens, and an optically enlarged image can be obtained. Furthermore, the optical image is electrically enlarged by an electronically variable power circuit. When the optically variable power is switched into the electronically variable power and vice versa, the operation of the variable power switch can be temporarily nullified to stop the variable power operation, and the switch is operated again to resume the operation. Thus, an operator can recognize the switch between the optically variable power and the electronically variable power. Furthermore, a time lag for a predetermined time can be set to switch between the optically variable power and the electronically variable power.

3 Claims, 5 Drawing Sheets

ELECTRONIC ENDOSCOPE APPARATUS FOR DISCRIMINATING OPTICALLY VARIABLE POWER FROM ELECTRONICALLY VARIABLE POWER

BACKGROUND OF THE INVENTION

This application claims the priority of Japanese Patent Application No. 2000-68384 filed on Mar. 13, 2000 which is incorporated herein by reference.

1. Field of the Invention

The present invention relates to an electronic endoscope apparatus, and more specifically to a configuration and control of a device enabling observation of an object by optically and electronically enlarging the object.

2. Description of the Prior Art

Recently, an electronic endoscope apparatus, etc. has been provided with a movable lens for variable power in an objective system of a scope tip, the movable lens is driven in an optical axis direction by an actuator, etc. so that an image of the object can be optically enlarged. The optically enlarged image is captured by a solid-state image pickup device such as a CCD (charge coupled device), etc., and an enlarged image of the object is displayed on the monitor by performing various image processes by a processor device on a video signal (image signal) output from the CCD.

BRIEF SUMMARY OF THE INVENTION

3. Object of the Invention

On the other hand, in the electronic endoscope, an image obtained by the above mentioned CCD has been electronically enlarged in an image process. Recently, it has been suggested that an image can be enlarged and displayed by combining optically variable power with electrically variable power by the above mentioned electronic objective system. The variable power operation based on the two types of variable power can be performed using the same variable power switch, etc.

However, when the optically variable power and the electronically variable power are realized by the same operating switch, there is a merit that a variable power operation can be continuously performed, but there is also a demerit that an operator cannot easily determine when the optically variable power is to be switched to the electronically variable power, and vice versa, or cannot easily determine whether the current image is enlarged by the optically variable power operation or the electronically variable power operation. That is, as compared with the optically variable power which does not lower the quality of an image when it is variably powered, the electronically variable power deteriorates the quality of an image, for example, when the image is enlarged. Therefore, when correct determination is required, it is necessary to be informed which variable power operation is adopted for the screen display.

The present invention has been developed to solve the above mentioned problems, and aims at providing an electronic endoscope provided with a variable power function capable of easily determining when the optically variable power is switched to the electronically variable power and vice versa.

SUMMARY OF THE INVENTION

To attain the above mentioned purpose, the present invention includes an optically variable power mechanism having a movable lens for variable power built in an optical objective system provided at the tip of the endoscope for optically obtaining an enlarge image, an electronically variable power circuit for electronically enlarging an image captured through the above mentioned optical objective system, a variable power switch for operating the variable power of the optically variable power mechanism and the electronically variable power circuit, and a control circuit for controlling the variable power operation performed by the variable power switch to temporarily stop the operation when the optically variable power and the electronically variable power are switched from each other during the operation of the variable power switch.

The above mentioned control circuit can be designed such that the variable power operation can be temporarily stopped by setting a time lag for a predetermined time when the optically variable power and the electronically variable power are switched from each other.

When the variable power operation is temporarily stopped based on the above mentioned time lag, means for informing an operator that the optically variable power is switched into the electronically variable power or vice versa is provided.

With the above mentioned configuration, for example, the optically variable power can be invoked in a state in which an image is not enlarged, and the electronically variable power can be invoked at the enlargement (near) end of the optically variable power. As a result, when the same switch is used to change the optically variable power into the electronically variable power, or to change the electronically variable power into the optically variable power, for example, the switching operation is nullified. That is, the variable power operation cannot work unless the variable power switch is operated again. Therefore, the operator can successfully determine or discriminate the time when the optically variable power and the electronically variable power are switched (changed) from each other. When they are switched, the variable power operation can be stopped for a predetermined time by entering any variable power operation with a time lag set for a predetermined time. In this case, it is desired to indicate on the monitor that the optically variable power is switched into the electronically variable power or vice versa.

DETAILED DESCRIPTION OF THE PREFERRED EMBODIMENTS

Figure 1:
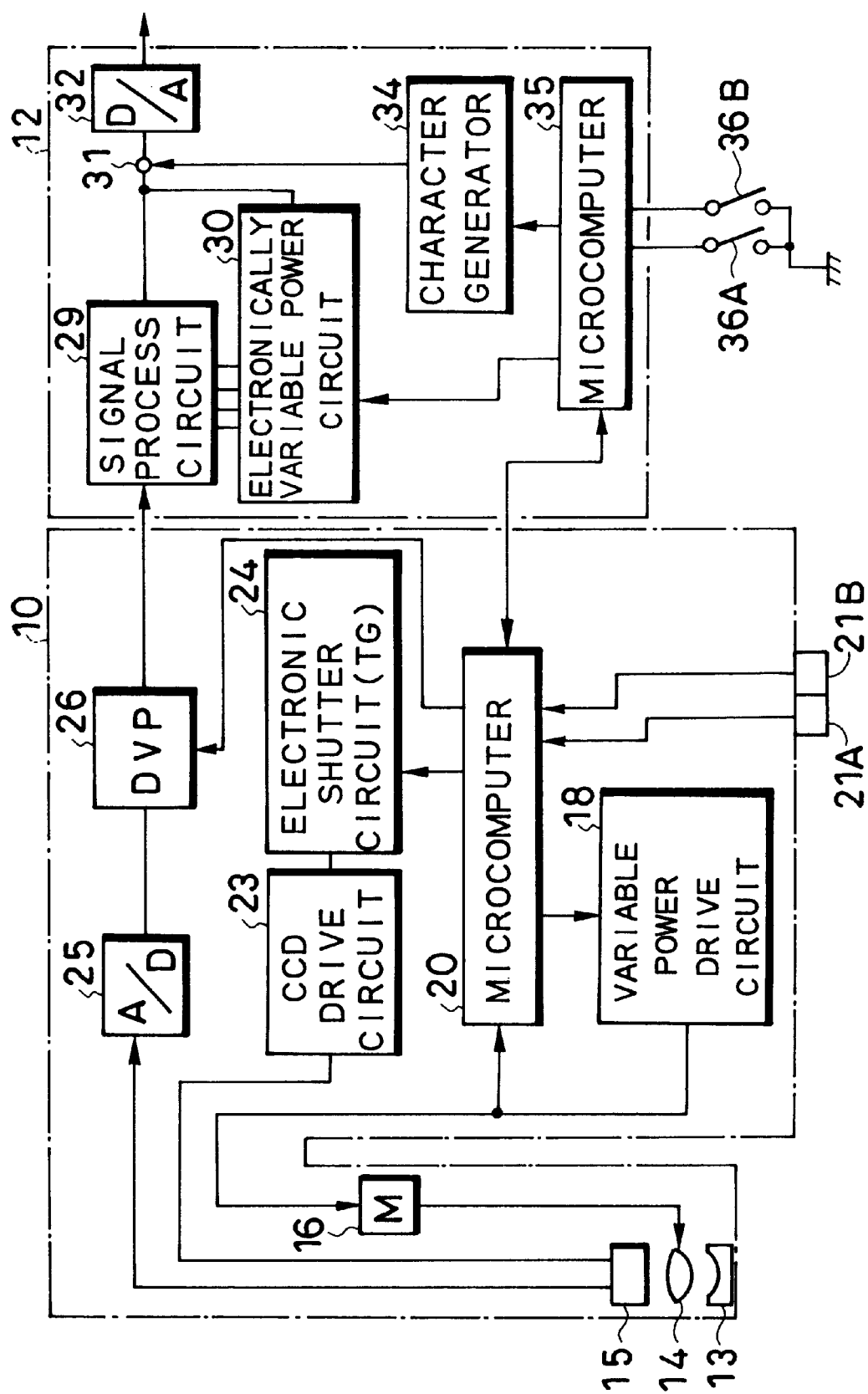
FIG. 1 is a block diagram of the configuration of the electronic endoscope according to an embodiment of the present invention.

FIG. 1 shows the configuration of the electronic endoscope according to an embodiment of the present invention.

This apparatus comprises an electroscope (electronic endoscope) 10 is mounted on a processor device 12 as freely attachable/detachable through a connector. In FIG. 1, the tip of the electroscope 10 contains an objective system with variable power comprising a fixed lens 13 and a movable lens 14. ACCD 15 is arranged as an image pickup device for receiving a light from the objective system.

For example, a motor 16 is connected to the above mentioned movable lens 14 through a drive unit, the rotating drive power of this motor 16 is transmitted to the tip through a linear transmission unit, and the rotating movement is converted into a linear movement to move the movable lens 14. Additionally, the motor 16 can be mounted on the tip to rotate a cylindrical cam (axis), thereby moving the movable lens 14. The above mentioned motor 16 can be replaced with another actuator for directly drive the movable lens 14.

Furthermore, a variable power drive circuit 18 for driving the motor 16 (or actuator) and a microcomputer 20 are provided in the electroscope 10. The variable power drive circuit 18 comprises a motor drive circuit, a driving voltage generation circuit, etc. In addition, the operating unit, etc. of the electroscope 10 contains a near (N) switch 21A for an enlarging operation and a far (F) switch 21B for a reducing operation as variable power switches. These operation signals are provided for the microcomputer 20.

That is, the microcomputer 20 receives an operation control signal of the N switch 21A or the F switch 21B, and transmits an enlargement control signal and a reduction control signal to the variable power drive circuit 18. In response to this, the variable power drive circuit 18 provides a predetermined motor driving voltage for the motor 16. By the rotation drive of the motor 16, the movable lens 14 moves in the optical axis direction, and an image of an object can be enlarged or reduced.

Figure 2:
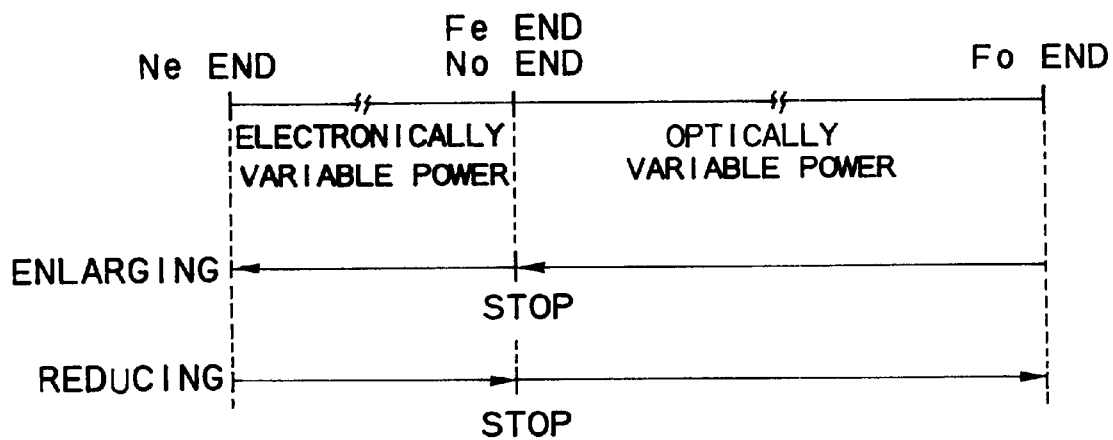
FIG. 2 shows enlarging and reducing operations performed by a variable power switch according to an embodiment.

Then, the microcomputer 20 performs the optically variable power when the above mentioned N switch 21A or the F switch 21B is operated, and performs the electronically variable power described later, thereby realizing the operations of both optically variable power and electronically variable power using a single variable power switch. When the optically variable power is switched into the electronically variable power or vice versa, the control is temporarily stopped. That is, as shown in FIG. 2, when the N switch 21A is continuously pressed (when an image is enlarged), the movable lens 14 is driven from the far end (Fo end) to the near end (No end). When the No end is reached, the operation of the N switch 21A is temporarily nullified. Then, when the N switch 21A is newly operated, control is performed from the far end (Fe end) of the electronically variable power to the near end (Ne end). When the F switch 21B is continuously pressed (when an image is reduced), similarly the switching operation is temporarily nullified at the Fe end of the electronically variable power.

In addition, in this example, the moving position of the movable lens 14 in the variable power operation is determined by a time count value from the near (No) end (or far (Fo) end). That is, when the entire moving time between drive end portions is measured, the moving position of the movable lens 14, that is, an enlarging status, can be obtained by the moving time count value from a predetermined end. Alternatively, the moving position of the movable lens 14 may be detected by an encoder to determine the enlargement state based on the detection value.

In the electroscope 10, a CCD drive circuit 23 for driving the CCD 15, an electronic shutter circuit 24 containing a timing generator (TG), are provided. Based on the control of the microcomputer 20, the electronic shutter circuit 24 controls the signal accumulation time (electronic shutter speed) of the CCD 15, and the image signal accumulated in the CCD 15 in a pixel unit is read by the CCD drive circuit 23. Furthermore, an A/D converter 25 and a digital video processor (DVP) 26 for performing various image processes are provided. The image signal read from the CCD 15 is converted into a digital signal, and then the DVP 28 performs various image processes for amplification, white balance, gamma amendment, etc. by the DVP 26.

On the other hand, the processor device 12 contains a signal process circuit 29 containing image memory, an electronically variable power circuit 30, a mixer 31, and a D/A converter 32. The electronically variable power circuit 30 forms an image enlarged in a signal process according to an image signal obtained by the DVP 26. Furthermore, it comprises a character generator 34 for outputting a character image (characters, graphics) representing the variable power position information displayed on the meter (FIG. 3), and a microcomputer 35. The character image output from the character generator 34 is mixed with the image of an object by the mixer 31.

Figure 3:
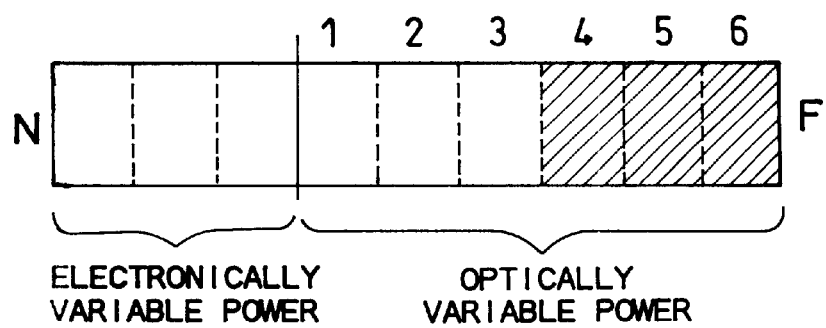
FIG. 3 shows the meter display on the monitor indicating the variable power (magnification) status according to an embodiment.

That is, as shown in FIG. 3, in the processor device 12, using a meter display image for sequentially lighting the divided areas in the bar-shaped unit extending in the horizontal direction, the divided areas are sequentially lighted from the far end to the near end with the N (near) positioned at the leftmost end, and the F (far) positioned at the rightmost end (refer to hatched portion. Then, the enlargement status (magnification) of the electronically variable power and the optically variable power are stepwise displayed on the left and the right respectively. Furthermore, the processor device 12 can also be provided with a foot switch (variable power switch) comprising an N switch 36A and an F switch 36B. These operation control signals are provided for the microcomputer 35.

The embodiment is configured as described above, and the effect is described below by referring to FIGS. 4 to 6. First, in step 101 shown in FIG. 4, it is determined by the microcomputer 20 whether or not the optically variable power is being performed. If Y (YES), the N switch 21A (or 36A) is pressed in step 102, and it is determines whether or not a near flag is set on. If Y, an optical near (optically enlarging) process is performed in step 103. If N (NO) in step 102, the F switch 21B (or 36B) is pressed in step 104, and it is determined whether or not a far flag is set on. If Y, an optical far (optically reducing) process is performed in step 105. If N in step 104, both flags are set off, and the motor 16 is stopped.

If N in step 101, control is passed to step 107. In step 107, the N switch 21A is pressed, and it is determined whether or not the near flag is set on. If Y, an electronic near (electronically enlarging) process is performed in step 108, and the electronically variable power circuit 30 performs an image enlarging process. If N in the above mentioned step 107, the F switch 21B is pressed in step 109, and it is determined whether or not the far flag is set on. If Y, an electronic far (electronically reducing) process is performed in step 110. If N in step 109, both flags are set off, and the electronically variable power process is stopped.

Figure 4:
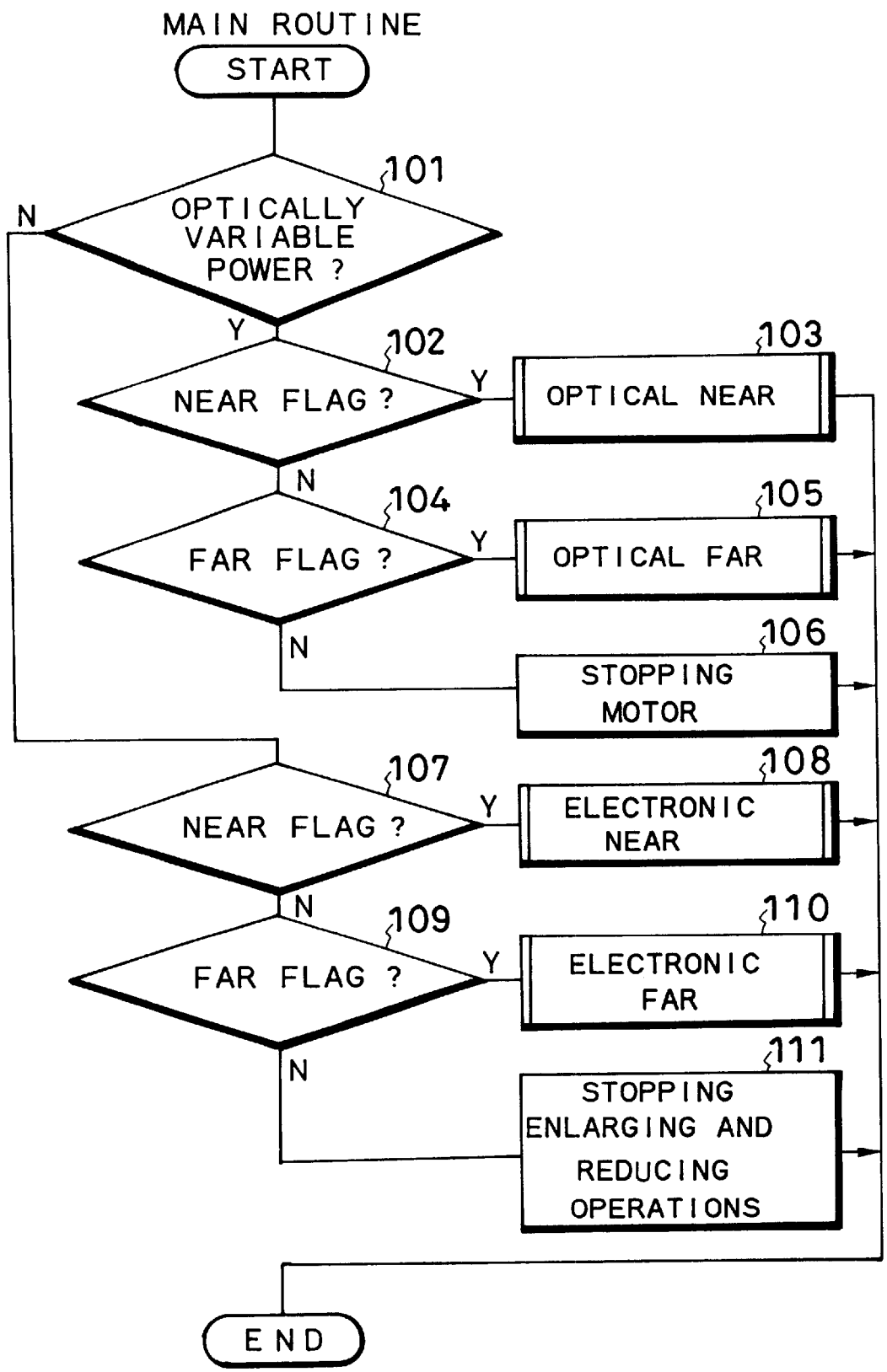
FIG. 4 is a flowchart of the operation of the main routine of the microcomputer of the electronic endoscope according to an embodiment.
Figure 5:
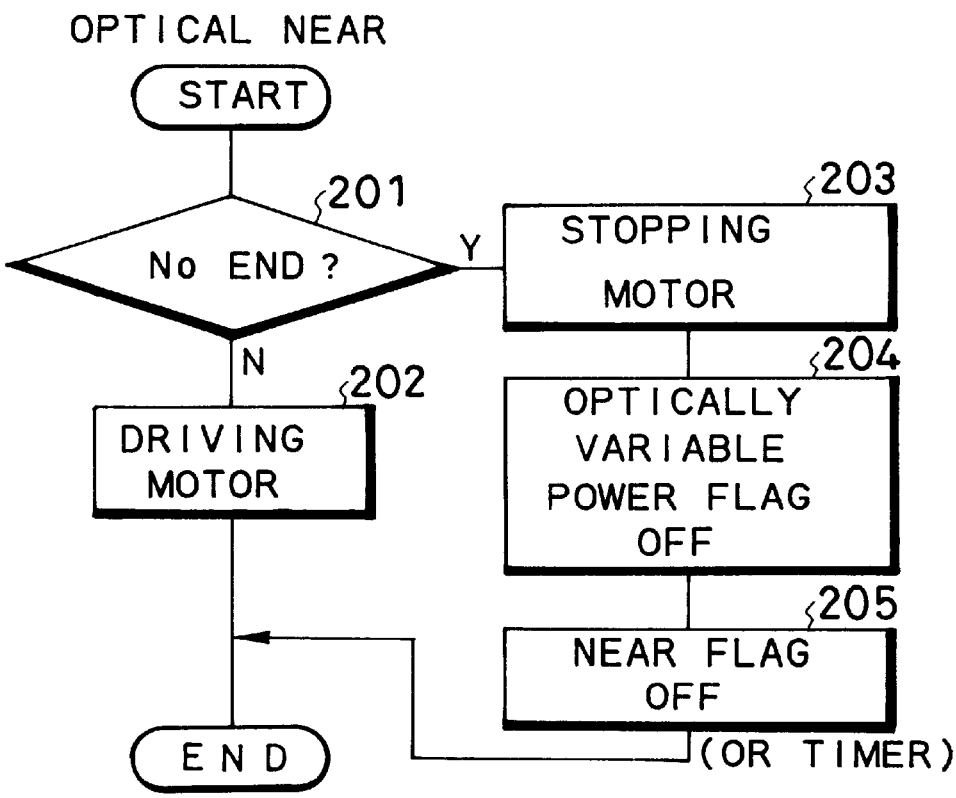
FIG. 5 is a flowchart of the operation of the optical near process shown in FIG. 4.

FIG. 5 shows the optical near process performed by the microcomputer 20 as shown in FIG. 4. In step 201, it is determined whether or not the moving position of the movable lens 14 is the No end. If N, then the variable power drive circuit 18 moves the motor 16 and the movable lens 14 is driven in the enlarging direction in step 202. On the other hand, if Y, the motor 16 stopped in step 203, and the optically variable power flag is set off in step 204. In step 205, the near flag is set off. That is, even if the N switch 21A is continuously pressed, the near flag is set off when the No end of the optically variable power is reached, and the switching operation is temporarily nullified. Therefore, the operator can be informed by the switch nullifying operation that the optically enlarging process has terminated. Afterwards, the electronically enlarging operation can be performed by pressing the N switch 21A again.

Figure 6:
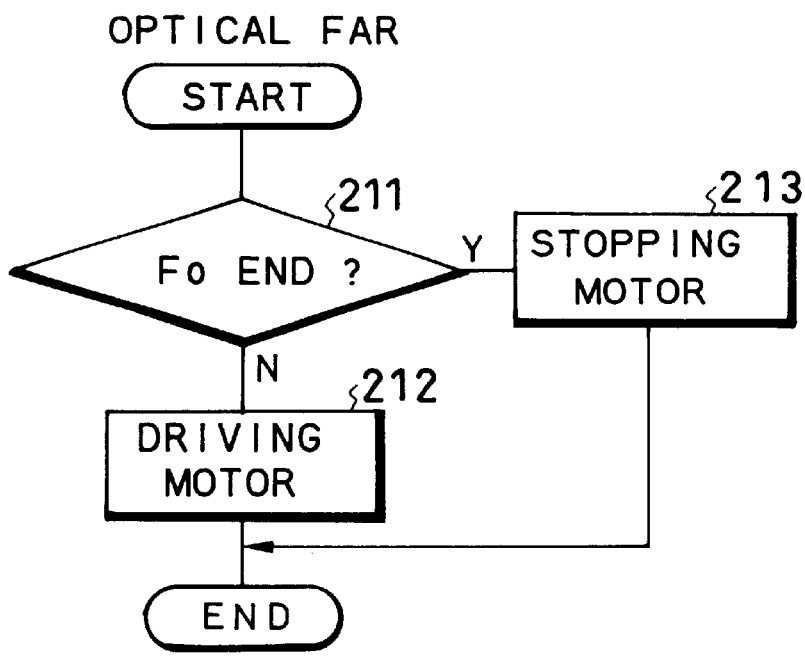
FIG. 6 is a flowchart of the operation of the optical far process shown in FIG. 4.

FIG. 6 shows the optical far process shown in FIG. 4. In step 211, it is determined whether or not the moving position of the movable lens 14 is the Fo end. If N, the variable power drive circuit 18 drives the motor 16 in step 212, and the movable lens 14 is driven in the reducing direction. On the other hand, if Y, the motor 16 is stopped in step 213, and an image is captured without an enlarging process.

Figure 7:
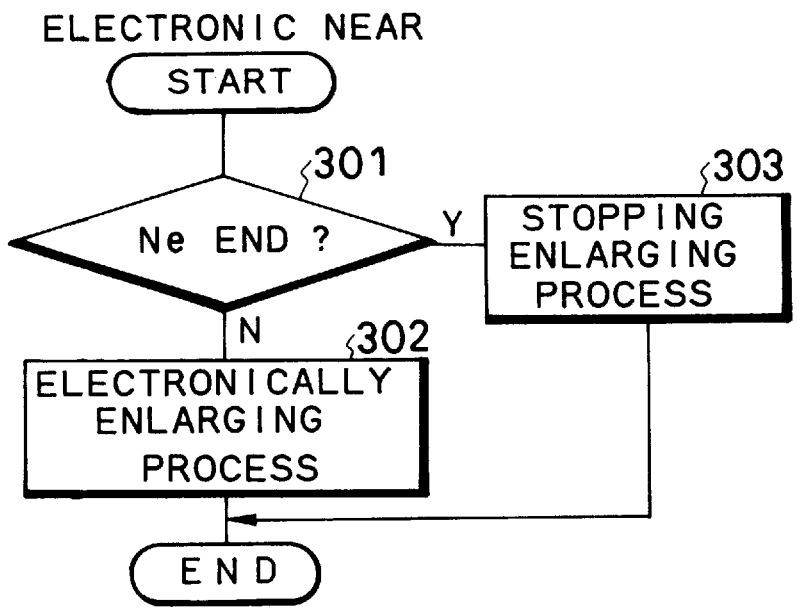
FIG. 7 is a flowchart of the operation of the electronic near process shown in FIG. 4.

FIG. 7 shows the electronic near process performed by the microcomputer 20 as shown in FIG. 4. In step 301, it is determined whether or not the current variable power position is the Ne end. If N, the electronically variable power circuit 30 performs the electronically enlarging process in step 302. On the other hand, if Y, the enlarging process is stopped in step 303, and a state without an electronically enlarging process is entered.

Figure 8:
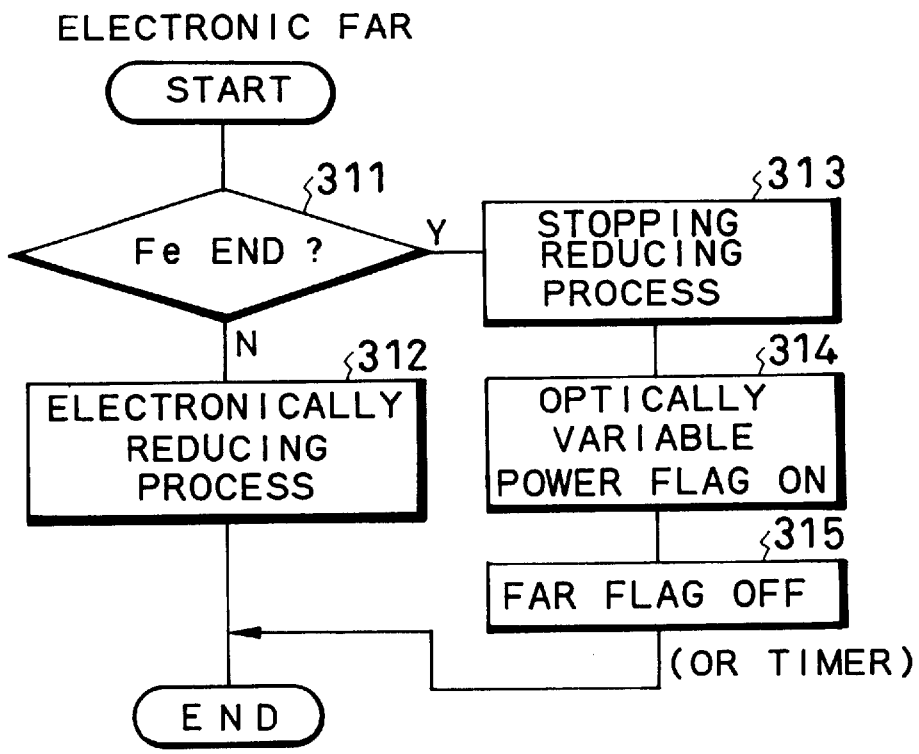
FIG. 8 is a flowchart of the operation of the electronic far process shown in FIG. 4.

FIG. 8 shows the electronic far process shown in FIG. 4. In step 311, it is determined whether or not the current variable power position is the Fe end. If N, the electronically variable power circuit 30 performs the electronically reducing process in step 312. On the other hand, if Y, the reducing process is stopped in step 313, the optically variable power flag is set on in the next step 314, and the far flag is set off in step 315. That is, even if the F switch 21B is continuously pressed, the far flag is set off when the Fe end of the electronically variable power is reached, thereby temporarily nullifying the switching operation. Therefore, the operator can be informed by the switch nullifying operation that the electronically reducing process has terminated. Afterwards, the optically reducing process can be performed by pressing the F switch 21B again.

Thus, the optically and variably powered image is captured by the CCD 15, and the image signal of the CCD 15 is read by the CCD drive circuit 23, and input to the DVP 26 through the A/D converter 25. The DVP 26 performs various image processes, and the results are displayed on the monitor through a signal process circuit 29 and the D/A converter 32 of the-processor device 12. On the other hand, the image electronically and variably powered image by the electronically variable power circuit 30 is provided for the monitor through the D/A converter 32.

Then, the meter display image formed by the character generator 34 is displayed on the monitor. In FIG. 3, for example, it is the fourth enlargement area (hatched portion) in the optically variable power area which is the third area from the F end. The display informs the operator of rough optical and electronic magnification.

In the above mentioned embodiment, the operations of the N switch 21A and the F switch 21B are nullified when the optically variable power and the electronically variable power are switched (changed) from each other. When they are changed, a predetermined time lag can be set. That is, in step 205 shown in 5 and in step 315 shown in FIG. 8, a timer for a predetermined time is set, a state in which the variable power operation is temporarily stop is set, and then the original state is restored. In this method, the operator can easily recognize the point when the optically variable power is switched into the electronically variable power, and vice versa.

When the time lag is set, control is performed on the meter display image shown in FIG. 3 such that the color of the lighted portion (hatched portion) indicating the variable power position can turn, for example, from white to blue or any other colors, or such that the lighted portion can turn into a blinking state. Thus, the operator can easily determined that the optically variable power is switched into the electronically variable power and vice versa.

As described above, according to the present invention, the switching point between the optically variable power and the electronically variable power can be easily recognized, and an image enlarged by the optically variable power for use in inspection or diagnostics can be easily discriminated in use from an image enlarged by the electronically variable power.

What is claimed is:

1. An electronic endoscope apparatus having a variable power function, comprising:

an optically variable power mechanism having a movable lens for variable power built in an optical objective system provided at a tip of an endoscope for optically obtaining an enlarge image;

an electronically variable power circuit for electronically enlarging an image captured through the optical objective system;

a variable power switch for operating variable power of said optically variable power mechanism and said electronically variable power circuit; and a control circuit for controlling a variable power operation performed by said variable power switch to temporarily stop the operation when optically variable power and electronically variable power are switched from each other during the operation of said variable power switch.

2. The apparatus having a variable power function according to claim 1, wherein said control circuit is designed such that the variable power operation can be temporarily stopped by setting a time lag for a predetermined time when the optically variable power and the electronically variable power are switched from each other.

3. The apparatus having a variable power function according to claim 1, further comprising:

means for informing an operator that the optically variable power is switched into the electronically variable power or vice versa when the variable power operation is temporarily stopped based on a time lag.

* * * * *